United States Patent
Iwamoto et al.

(10) Patent No.: US 8,291,816 B2
(45) Date of Patent: Oct. 23, 2012

(54) DRAWER TYPE COOKING DEVICE

(75) Inventors: Masayuki Iwamoto, Osaka (JP);
Masamitsu Kishimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 535 days.

(21) Appl. No.: 12/474,952

(22) Filed: May 29, 2009

(65) Prior Publication Data
US 2009/0301312 A1    Dec. 10, 2009

(30) Foreign Application Priority Data

Jun. 4, 2008    (JP) ................................ 2008-146722
Jun. 4, 2008    (JP) ................................ 2008-146723

(51) Int. Cl.
*A21B 1/40*    (2006.01)
*H05B 6/80*    (2006.01)
*A47B 81/00*    (2006.01)

(52) U.S. Cl. ............ 99/467; 99/468; 219/763; 219/756; 219/392; 219/391; 312/332; 312/330.1; 362/92; 362/94

(58) Field of Classification Search ............ 99/467, 99/468, 470; 219/762, 763, 756, 757, 392, 219/391; 312/330.1, 332; 362/92, 94, 132
See application file for complete search history.

(56) References Cited

U.S. PATENT DOCUMENTS

| | | | | |
|---|---|---|---|---|
| 5,960,785 | A * | 10/1999 | Byrne et al. | 126/200 |
| 6,166,353 | A * | 12/2000 | Senneville et al. | 219/385 |
| 6,361,181 | B1 * | 3/2002 | Bales | 362/92 |
| 7,244,916 | B2 * | 7/2007 | Iwamoto | 219/756 |
| 7,345,264 | B2 * | 3/2008 | Yoshidome | 219/756 |
| 7,488,919 | B2 * | 2/2009 | Gagas et al. | 219/400 |
| 2002/0171335 | A1 * | 11/2002 | Held | 312/223.6 |

FOREIGN PATENT DOCUMENTS

| | | |
|---|---|---|
| JP | 60-211811 A | 10/1985 |
| JP | 3-45820 A | 2/1991 |
| JP | 6-50181 U | 7/1994 |
| JP | 9-36557 A | 2/1997 |
| JP | 2001-340151 A | 12/2001 |
| JP | 2003-372 A | 1/2003 |

(Continued)

*Primary Examiner* — Reginald L Alexander
(74) *Attorney, Agent, or Firm* — Birch, Stewart, Kolasch & Birch, LLP

(57) ABSTRACT

The invention provides a drawer type cooking device having an operation unit disposed on an upper portion of a drawer body so as to increase the height of the drawer body within a cooking device body as much as possible, capable of facilitating power supply and signal transmission between the control unit within the cooking device body and the operation unit when the drawer body is opened and closed. Slide mechanisms 4 disposed on left, right and bottom portions enabling the drawer body 2 to be moved into and out of the cooking device body 1 are composed of conductive materials, so as to provide a slidable state with constant conduction. By transmitting data via serial communication and supplying power to the operation unit from the cooking device body 1 to the drawer body 2, it becomes possible to dispose the operation unit on a door 2*a* being opened and closed. By forming the operation unit including a microcomputer for communication on the drawer body 2, it becomes possible to increase the ceiling height of the drawer body 2, increase the ceiling height and capacity of the heating chamber 3, and enlarge the height limitation of an object to be cooked. An illuminating light source 25 disposed on the door 2*a* of the drawer body 2 can also receive power supply via the arrangement described above to illuminate food loaded in the drawer body 2.

6 Claims, 6 Drawing Sheets

FOREIGN PATENT DOCUMENTS

| | | |
|---|---|---|
| JP | 2004-40863 A | 2/2004 |
| JP | 2004-267599 A | 9/2004 |
| JP | 2005-221081 A | 8/2005 |
| JP | 2008-8562 A | 1/2008 |

* cited by examiner

DRAWER TYPE COOKING DEVICE

The present application is based on and claims priority of Japanese patent applications No. 2008-146722 filed on Jun. 4, 2008 and No. 2008-146723 filed on Jun. 4, 2008, the entire contents of which are hereby incorporated by reference.

BACKGROUND OF THE INVENTION

1. Field of the Invention

The present invention generally relates to cooking devices, and more specifically, relates to drawer-type cooking devices in which a drawer body storing or loading therein an object to be cooked is placed in the interior of the cooking device body and capable of being drawn out therefrom.

2. Description of the Related Art

In a drawer type cooking device built into a kitchen unit, the size of the opening of a heating chamber disposed on a front side of the cooking device body is factually standardized into a few designs, and therefore, the width, depth and height of the built-in cooking device must satisfy determined sizes. For example, the cooking device that the present applicant has already provided to the market in the United States has a width of approximately 55 cm (24-inch standard) or approximately 77 cm (30-inch standard), depth of approximately 60 cm, and a height of approximately 37 cm. As described, there are two width sizes, a 24-inch standard size and a 30-inch standard size, but the heights and depths thereof are the same.

Since the heating chamber of a cooking device must be arranged together with electrical and mechanical components within the above-mentioned standard external size, the adjustment between the demands of users and the external size of the device occupies a large portion in designing the drawer type cooking device.

The width and depth of the heating chamber should be wide enough to enable pizza and other foods to be placed therein, and such size is relatively easy to realize, considering the portions occupied by the movement mechanisms disposed on both sides of the heating chamber. However, the height of even the external size of the drawer type cooking device is already lower than normal cooking devices placed on counter tops, so that if the cooking device is designed via normal structural design, the ceiling height of the cooking device becomes too small. If the ceiling height of a high-frequency cooking device is too low, it becomes difficult to use cooking containers with sufficient depths, and it is impossible to reheat drinks in a cup having a high height since the cup will not fit in the cooking device with a low ceiling. The users will be unsatisfied if commercial coffee cups (coffee mugs) provided at coffee shops or the like cannot be placed in the cooking device.

Therefore, in order to ensure the desired ceiling height with respect to the limited heating chamber height, it is necessary to cut down structures arranged on the ceiling portion and the floor portion as much as possible, for example by moving and rearranging the devices on the ceiling portion and the floor portion to side walls, but there are devices still occupying the ceiling and floor portions that cannot be moved to other spaces in order to exert the necessary functions of the cooking device, which was a drawback in designing a user-friendly drawer type cooking device.

Further, an illuminating light within the chamber of cooking devices, especially microwave ovens, is normally fixed to the inner wall of a heating chamber. During cooking operation and opening of the door, the illuminating light is turned on to illuminate the interior of the heating chamber so as to illuminate the object being cooked (cooked food) in the heating chamber for the convenience of the user. However, in a drawer type cooking device, when the door is opened and closed, the whole body of the drawer is moved together with the object to be cooked. Therefore, when the drawer body is drawn out by opening the door, the food having been moved together with the drawer body cannot be illuminated by the illuminating light fixed on the wall. Especially in a large-size cooking device, the light emitted from the illuminating light in the chamber does not reach the food drawn out from the chamber.

In a rotating door widely adopted in cooking devices, a rotating shaft is provided at a hinge portion and the distance of movement of the door is zero at the portion, enabling a known arrangement to be adopted in which a lead wire is disposed at the hinge portion or an area near the hinge portion so as to supply power and transmit signals between the cooking device body and the door. However, in drawer type cooking devices, since the whole drawer body moves and no shaft corresponding to the hinge portion exists, if a lead wire is used to supply power and transmit signals, the lead wire must be bent and extended repeatedly in response to the movement of the drawer body, which is extremely difficult from the viewpoint of durability, and in order to dispose an illuminating device on the door being moved away from the cooking device body, it is necessary to supply power to the door, that is, to connect the cooking device body and the door portion via a lead wire or the like in order to supply power to the illuminating light source disposed on the drawer body from the cooking device body.

It is also common to use rails instead of lead wires for power distribution, but they are extremely expensive. On the other hand, noncontact type power transmission means require a power storage means to be disposed on the door, since when the door is opened, it is impossible to send power and signals to the door. Furthermore, since the transmission efficiency is deteriorated when the inner side of the door is not in close contact with the front side of the heating chamber, durability is require with respect to the opening and closing of the door.

Incandescent lamps used conventionally as illuminating lights inside cooking devices have drawbacks in that they are liable to filament damage due for example to the impact caused by opening and closing the door, that they have extremely low illuminating efficiency requiring a large current and causing power delivery difficulties, and that they are large in size and cause large heat generation requiring ventilation and occupying a large space on the door.

Japanese patent application laid-open publication No. 3-45820 (patent document 1) discloses a high frequency cooking device to be placed on a kitchen counter or the like in an open manner, comprising a cooking device body including a cooking chamber for storing an object to be cooked, a door for shutting the cooking chamber from atmosphere, a bottom plate slid in an interlocking motion with the movement of the door, and a slide mechanism for sliding the bottom plate smoothly.

Furthermore, there is known a drawer type cooking device built into a kitchen counter in which an object to be cooked is loaded in a drawer body drawn out of the cooking device body, and the drawer is moved back into the cooking device body so as to cook the object within the cooking device.

The present applicant has disclosed in Japanese patent application laid-open publication No. 2005-221081 (patent document 2) a cooking device having a plurality of sliding mechanisms disposed on the exterior of a heating chamber for moving the drawer body together with a door so that the drawer body is drawn out and stored with respect to the interior of the heating chamber.

Further, Japanese utility model application laid-open publication No. 06-50181 (patent document 3) discloses a power distribution structure for a furniture capable of preventing wires from being exposed. According to the disclosed power distribution structure of a furniture, conduction areas and non-conduction areas are disposed respectively in a fixed section and a moving section constituting the slide portion of the furniture, so that power conduction is enabled by having a fixed section conductor and a moving section conductor come into contact with each other at a given slide condition. The structure realizes power conduction and the switching thereof by having the conductor in the slide portion come into contact with the conductor or a nonconductor.

Japanese patent application laid-open publication No. 9-36557 (patent document 4) discloses a slide rail used for drawing in and out inner units of office automation equipments such as copiers, having a case-side rail formed of an electrically conductive material, a unit-side rail formed of an electrically conductive material and electrically connected to a unit, and an electrically conductive contact provided between the front outer surface of the case-side rail and the rear outer surface of the unit-side rail so as to electrically connect the case-side rail and the unit-side rail together. According to the disclosed slide rail, the electricity charged to the unit is conducted from the unit-side rail via the electrically conductive contact to the case-side rail and reaches the case, which is earthed thereby.

Japanese patent application laid-open publication No. 2004-40863 (patent document 5) discloses a cable guide bent in an S-shaped form guiding a supplyer cable connecting a fixed structure and a moving structure capable of sliding movement. According to the disclosed cable guide, the sagging of the cable can be stabilized and absorbed by a simple configuration. Further, Japanese patent application laid-open publication No. 60-211811 (patent document 6) discloses a means for receiving energy in a noncontact manner and converts the same into electric power, and to perform data transmission in a noncontact manner utilizing electromagnetic induction or photovoltaic devices.

As disclosed in patent documents 3 and 4, some prior arts have been disclosed in the field of office machinery and plant facility regarding means for ensuring electric conduction between a fixed member and a movable member, but the application of such means to cooking devices for household use is difficult, since such means are extremely expensive compared to the conventional power supply means such as lead wires.

Further, the noncontact power supply means disclosed in patent document 5 requires to activate an operation unit and a display unit via a power storage means such as a capacitor when the door is opened, which is already commercially applied to refrigerator doors since they are rarely left opened for a long period of time, but since the door of cooking devices are possibly left opened for a long period of time, and since the application requires a large-scale power storage means and various high-level controls regarding turning off the storage means and bringing the same to a standby state, the application of such noncontact power supply means is not a convenient method to solve the problems of the prior art drawer type cooking devices.

SUMMARY OF THE INVENTION

A drawer type cooking device is usually built into a kitchen counter, and in such case, the operation unit of the cooking device is disposed on an upper portion of the cooking device body so as to improve the visual confirmation and operation of the user. Therefore, in designing the heating chamber and the drawer body of the cooking device and determining the heights thereof, the height corresponding to the operation unit must be reduced from the ceiling height of the cooking device. In such case, the height of the cooking chamber and the drawer body is set lower than the ceiling height of the cooking device corresponding to the height of the operation unit, according to which the capacity of the heating chamber and the allowable height of the object to be cooked are reduced. Therefore, if it is possible to arrange the operation unit on the upper portion of the door of the drawer body, the reduced ceiling height of the drawer body caused by disposing the operation unit on the upper portion of the cooking device body can be solved, but such arrangement has a drawback in that the power supply and signal transmission between the control unit disposed in the cooking device body and the operation unit of the drawer body moved to open and close with respect to the cooking device body becomes difficult.

Further, if the illumination device is disposed on the drawer body, the relative position between the illumination device and the drawer body will not differ even when the drawer body is drawn out of the heating chamber, so that the illumination device can illuminate the food being cooked moved together with the opening and closing of the door. However, this arrangement has a drawback in that the power supply from the power supply unit disposed on the cooking device body to the illumination device moved together with the drawer body that moves in opening and closing operation with respect to the cooking device body becomes difficult.

Therefore, in order to supply power and transmit signals between the cooking device body and the drawer body, it is common to provide connection via a bendable lead wire such as a flexible cable, but such cables are relatively expensive, and the durability of the lead wire becomes a problem with respect to the repeated opening and closing operation of the drawer body. Therefore, one problem to be solved is to supply power and transmit signals between a cooking device body and a drawer body movable with respect to the cooking device body and having an operation unit disposed thereon using an existing mechanism, and realizing superior durability.

Further, it is generally considered possible to connect a bendable lead wire such as a flexible cable to supply power between the cooking device body and the drawer body. However, such cables are relatively expensive, and the lead wires are subjected to bending motion for a number of times corresponding to the number of times the door is opened and closed with the movement of the drawer body, by which the lead wires are liable to disconnection. Since power supply via lead wires is extremely disadvantageous from the viewpoint of durability, it is very difficult to put such arrangement into practice. Therefore, the present invention aims at solving the problem by utilizing existing mechanism exerting high durability for supplying power and transmitting signals between the cooking device body and the drawer body capable of being moved with respect to the cooking device body.

The object of the present invention is to provide a drawer type cooking device capable of utilizing existing conductive mechanisms to realize necessary power supply and signal transmission between the cooking device body and the drawer body movable with respect to the cooking device body at a low cost without using bendable lead wires, so as to ensure a drawer body having a highest possible height with respect to the height of the cooking device body as a result.

Another object of the present invention is to provide a drawer type cooking device capable of utilizing existing conductive mechanisms between a cooking device body and a drawer body movable with respect to the cooking device body without using bendable lead wires to supply necessary power to an illumination device arranged on the drawer body at a low cost.

In order to solve the problems mentioned above, the present invention provides a drawer type cooking device comprising a cooking device body having formed therein a heating chamber with an opening that communicates the heating chamber with the exterior; a power supply unit disposed on the cooking device body; a drawer body capable of being drawn out from the interior of the heating chamber of the cooking device body to the exterior, having a door capable of shutting the opening of the heating chamber when the drawer body is at a stored position within the heating chamber; movement mechanisms for moving the drawer body; wherein the cooking device body has a control unit for controlling the operation of the cooking device; the movement mechanisms are disposed on left and right outer sides and a bottom side of the heating chamber; the movement mechanisms include a fixed rail attached to the cooking device body and a movable rail attached to the door of the drawer body and slidable with respect to the fixed rail; the drawer body has an operation unit to be operated by a user; and the movement mechanisms provide a power supply path connecting the power supply unit and the operation unit for supplying power to the operation unit, and a transmission path connecting the control unit and the operation unit for transmitting signals between the operation unit and the control unit.

According to the above-mentioned drawer type cooking device, the slide mechanisms on left, right and bottom sides of the drawer body and the cooking device body are at a slidable state providing constant conduction, so that power supply to the operation unit and signal transmission between the operation unit and the control unit becomes possible via low-cost components.

In the drawer type cooking device, the fixed rail and the movable rail of the movement mechanism should preferably maintain conductivity throughout the whole section of movement. Further, the power supply path can be formed by using at least two of the movement mechanisms, and the transmission path can be formed by using at least two of the movement mechanisms. In other words, signal transmission and power supply can be performed in a superposed manner using a two-line or three-line conduction path and performing isolation at the operation unit, according to which the operation unit can be arranged on the upper portion of a door of the drawer body for operating the cooking device.

In order to solve the problems of the prior art, the present invention provides a drawer type cooking device comprising a cooking device body having formed therein a heating chamber with an opening that communicates the heating chamber with the exterior; a power supply unit disposed on the cooking device body; a drawer body capable of being drawn out from the interior of the heating chamber of the cooking device body to the exterior, having a door capable of shutting the opening of the heating chamber when the drawer body is at a stored position within the heating chamber; and movement mechanisms for moving the drawer body; wherein the movement mechanisms are disposed at least on left and right outer sides of the heating chamber; the movement mechanisms include a fixed rail attached to the cooking device body and a movable rail slidable with respect to the fixed rail and attached to the door of the drawer body; the drawer body has an illumination device for illuminating the interior of the drawer body; and the movement mechanisms provide a power supply path connecting the power supply unit and the illumination device for supplying power to the illumination device.

In drawer type cooking devices, slide rails are disposed connecting the cooking device body and the drawer body, but conventionally, the slide rails have been considered to be used solely for the purpose of drawing out the drawing body. The present drawer type cooking device utilizes the movement mechanisms on the drawer body and the cooking device body realizing a slidable state providing constant conduction to supply power to the illumination device of the drawer type cooking device, so that power supply to the illumination device is enabled using durable and low-cost components.

According to the present drawer type cooking device, it is preferable that the fixed rail and the movable rail of the movement mechanism maintain conductivity throughout the whole section of movement. Further, the power supply path can be formed by using at least two of the movement mechanisms. Moreover, an illuminating light source of the illumination device can be a light-emitting diode. Since light-emitting diodes have high emission efficiency as illuminating light source and are small-sized point light sources, they occupy little space when mounted on the drawer body, especially on the door of the drawer body. Moreover, by arranging the illumination device on an upper end portion of the door, the interior of the drawer body can be widely illuminated by the illumination device from the upper end portion of the door toward the lower rear direction thereof. Further, the illumination device should be lighted at least when the drawer body is drawn out of the heating chamber and when cooking is performed with the drawer stored in the heating chamber, according to which the convenience of the user is enhanced.

According to the present drawer type cooking device, the signal transmission from the cooking device body to the drawer body and the power supply to the operation unit are performed via already-existing movement mechanisms disposed on the exterior of the heating chamber, so that the operation unit or operating microcomputer of the cooking device can be disposed on the door of the drawer body instead of on the cooking device body. Therefore, it becomes possible to increase the height of the heating chamber formed on the cooking device body, ensure a highest possible height of the drawer body, and increase the height restriction of the object capable of being stored in the drawer body to be heated. Further, since existing movement mechanisms are used as power supply path and signal transmission path so that there is no need to dispose bendable cables, the necessary power supply and signal transmission can be performed at a low cost, the power supply and signal transmission paths are influenced very little by the microwaves used for cooking, and the paths exert durability even when the drawer body is repeatedly opened and closed.

Further according to the present drawer type cooking device, since the power supply from the cooking device body to the illumination device disposed on the drawer body is realized via existing movement mechanisms disposed on the exterior of the heating chamber, the present cooking device utilizes the existing movement mechanisms on the drawer body and the cooking device body that realize a slidable state providing constant conduction as power supply path without providing additional components, so that the power supply to the illumination device can be performed at a low cost. Moreover, since there is no need to use bendable lead wires, durability is exerted even after repeated opening and closing operation of the drawer body, since the present arrangement does not adopt lead wires liable to disconnection of signal wire caused by the opening and closing operation of the door.

Further, the present arrangement is rarely influenced by the microwaves used for heating and cooking. Moreover, since the illumination device of the cooking device can be disposed on the drawer body and not on the cooking device body, the illumination device can illuminate the interior of the drawer body even after the drawer body is drawn out. Further, if an LED is used as solid light source of the illumination device, there is no drawback of filament damage as in incandescent lamps, and there is extremely small possibility of damage and failure being caused by the impact accompanying the opening and closing of the door. Another advantage of disposing the illumination device on the door is that the replacement of the light source when failure occurs is facilitated.

DETAILED DESCRIPTION OF THE PREFERRED EMBODIMENTS

Figure 1:
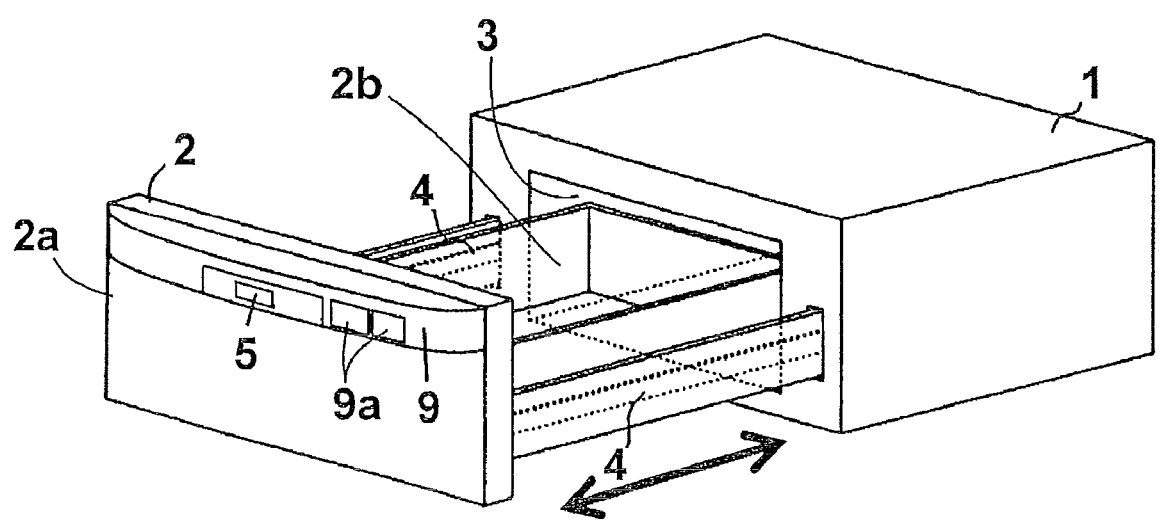
FIG. 1 is a perspective view showing the overall exterior of the drawer type cooking device according to one embodiment of the present invention.
Figure 2:
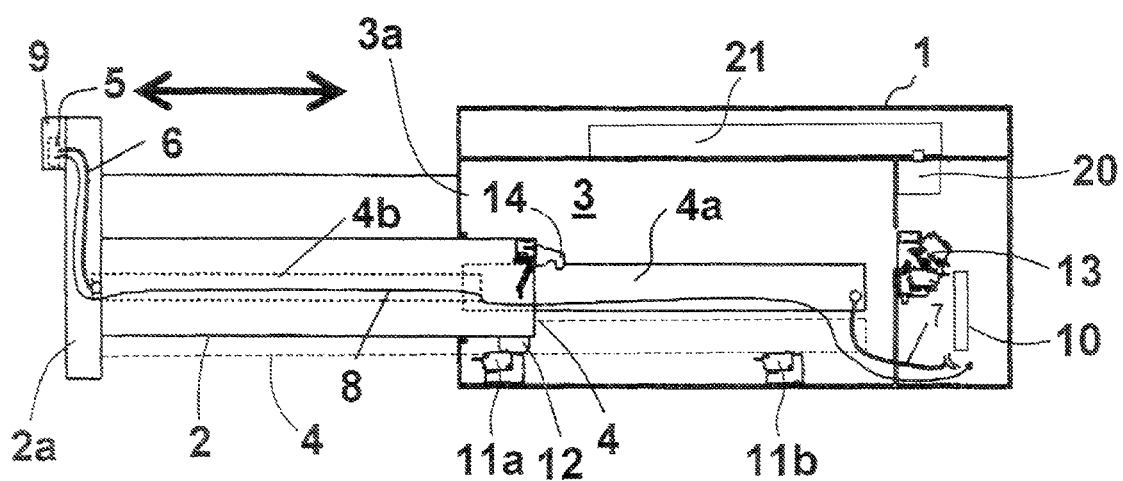
FIG. 2 is a partially cutaway side view of the drawer type cooking device illustrated in FIG. 1.

Now, the preferred embodiments of a drawer type cooking device according to the present invention will be described with reference to the drawings. FIG. 1 is a perspective view showing the overall exterior of the drawer type cooking device according to one embodiment of the present invention. FIG. 2 is a partially cutaway side view of the drawer type cooking device illustrated in FIG. 1.

As illustrated in FIG. 1, the drawer type cooking device (hereinafter referred to as cooking device) comprises a cooking device body 1 and a drawer body 2 capable of being drawn out of the cooking device body 1. In the interior of the cooking device body 1 is formed a heating chamber 3 for heating an object to be heated loaded on the drawer body 2. On the front side of the cooking device body 1 is formed an opening 3a enabling the drawer body 2 to be drawn out of the heating chamber 3.

The drawer body 2 comprises a door 2a for opening and closing the heating chamber 3, and a container-like housing portion 2b to which the door 2a is attached to store the object to be heated in a loaded state. The drawer body 2 is movably arranged via a slide mechanism disposed on the outer side of the heating chamber 3 in directions shown by the arrows of FIG. 1 with respect to the cooking device body 1, so that it can be drawn out in the frontward direction from the interior of the heating chamber 3. The drawer body 2 is supported on the cooking device body 1 via the door 2a connected to the slide mechanism, and via rollers or the like rollably supporting the housing portion 2b to the heating chamber 3. The drawer body 2 can be moved between a drawn-out position (corresponding to the drawn out state of FIG. 1) in which the drawer body 2 is drawn out in the frontward direction from the cooking device body 1 with the housing portion 2b placed outside the opening 3a, and a stored position in which the drawer body 2 is pushed into the cooking device body 1 with the housing portion 2b stored in the heating chamber 3. When the door 2a closes the opening 3a of the heating chamber 3, the interior of the heating chamber 3 is sealed via the inner walls of the cooking device body 1 and the drawer body 2, preventing microwaves generated during heating from leaking to the exterior.

The slide mechanisms include left and right slide mechanisms 4 and 4 disposed on the outer sides of both left and right sides of the heating chamber 3, and a center slide mechanism 4 (not shown in FIG. 1. shown schematically in FIG. 2 by dashed line 4 at the bottom of the drawer, and shown in FIG. 3 as BOTTOM 4) disposed on the lower center area at the outer side of the heating chamber 3. As shown in FIG. 2, the left and right slide mechanisms 4 respectively include a fixed rail 4a attached to the cooking device body 1 and a movable rail 4b attached to the drawer body 2 and capable of sliding along the fixed rail 4a. The fixed rail 4a and the movable rail 4b are composed of conductive metallic material, so that conductivity is maintained throughout the entire slide section of the rails, and within that section, conduction is enabled via the respective slide surfaces of rails 4a and 4b. Grease must be applied to the sliding movement portion of the slide mechanisms 4' in order to guarantee repeated opening and closing movement of the door 2a, and in order to ensure conductivity of the sliding movement portion, conductive grease is used as grease. Further, the movable rail 4b is fixed in an insulated state to the door 2a exposed to microwave irradiation. Insulation is provided between the support angle and the cooking device body 1 when mounting the slide rail according to which the slide rail can be used to supply power instead of the lead wire.

The door 2a of the drawer body 2 has an operation unit 9 that is hung over the front side of the door, also utilized as a handle when opening and closing the door manually. Various operation buttons 9a for not only opening and closing the door 2a but for selecting various cooking modes can be arranged on the operation unit 9. On the operation unit 9 is disposed a control unit 5 composed of a microcomputer for performing various control of the cooking device. The control unit 5 can include a display unit such as a liquid crystal panel, although it is not shown in the drawing.

A power supply line 6 for driving the control unit 5 is connected between the movable rail 4b and the control unit 5. Further, a power supply line 7 is connected between the fixed rail 4a and a power supply unit 10. Thus, driving power is supplied to the microcomputer of the control unit 5 from the power supply unit 10 via a power supply path composed of the power supply line 6, the body of the slide mechanism 4 (fixed rail 4a and movable rail 4b) and the power supply line 7. Further, a transmission path 8 (illustrated as a line, but actually the transmission path is composed of the body of the slide mechanism 4) for transmitting various control signals such as for the draw-out operation of the drawer body 2 of the drawer type cooking device and for heating and cooking operations is formed via the slide mechanism 4 from the control unit 5.

The door 2a of the drawer body 2 has disposed on the upper portion thereof an operation unit 9 hung over the front side of the door and functioning as the handle for moving the drawer body manually. An illumination device 25 for illuminating the drawer body 2 is arranged on the operation unit 9. The upper front side of the cooking device body 1 can have various operations buttons 9 for selecting the cooking modes or the like, a control unit composed of a microcomputer for performing various control of the cooking device, and a display unit such as a liquid crystal panel not shown.

An LED light source, which is a solid point light source, is used as the illumination device 25. The LED light source is preferable, since it has no fear of filaments being damaged as in incandescent lamps, and extremely small possibility of being damaged and malfunctioning due to the impact caused by opening and closing the door. By arranging an illumination device 25 on the upper portion of the door 2a, the light source can be easily exchanged when malfunction occurs. The illumination device 25 illuminates the lower rear direction from the upper end of the door 2a, so as to illuminate the object to be heated (cooked food) loaded on the drawer body 2, regardless of whether the drawer body 2 is drawn out or stored.

A power supply line 6 is connected to the movable rail 4b so as to supply power to the illumination device 25. Further, a power supply line 7 is connected between the power supply unit 10 and the fixed rail 4a. Therefore, power is supplied to the illumination device 25 via the power supply path composed of the power supply unit 10, the power supply line 6, the body of the slide mechanism 4 (fixed rail 4a and movable rail 4b) and the power supply line 7. A power supply path 8 illustrating the above-mentioned power supply is illustrated in frame format.

Switches 11a and 11b are provided on the cooking device body 1 for cooperating with an operation element 12 provided on the drawer body 2 to detect the fully drawn-out position and the fully closed stored position of the drawer body 2. Further, the drawer body 2 has a latch 14 that can be engaged with a hook 13 provided on the cooking device body 1 at the stored position. From the viewpoint of safe operation of the cooker, the power for heating is capable of being supplied only when the latch 14 is engaged to the hook 13. Further, a magnetron 20 for generating microwaves is disposed in the space on the rear side of the cooking device body 1 together with the power supply unit 10, and a waveguide 21 for guiding the microwaves generated via the magnetron 20 to the heating chamber 3 is disposed in the ceiling space of the cooking device body 1. Even further, a rotating antenna and an antenna motor are built into the ceiling space, although not shown.

Since the rails 4a and 4b and the driving mechanism thereof (motor) are disposed in an isolated manner from the heating chamber 3, they do not require the use of expensive components and materials having heat resistance and flame retardancy, and they are prevented from being exposed to microwaves causing high temperature and discharge that may lead to failure, and from being influenced by food residue. Further, since the respective slide mechanisms 4 are disposed on the outer side of the heating chamber 3 as described, when the door 2a is closed, the opening 3a is closed with respect to the cooking device body 1 so as to prevent microwave leakage, and the slide mechanism 4 is completely isolated from the heating chamber 3. Further, the magnetron 20 which is a microwave generating device can receive power supply only when the door 2a is completely closed. Therefore, when the magnetron 20 is activated, the microwaves do not have any influence on the respective metallic rails of the slide mechanism 4 which constitute paths for control signals and power supply for supplying microcomputer driving power and other powers. Even further, since the present cooking device is designed to disconnect the power supply to the magnetron 20 when the door 2a is opened even very slightly, so that the microwaves will not affect the metallic rails of the slide mechanism 4. Further, the voltage or power supplied to drive the microcomputer 9 or to display information on the liquid crystal display unit is of low-voltage and low-power, and is isolated from commercial power supplies via a power supply transformer, a rectifier circuit and the like, so that there will be no problem even if someone touches the slide mechanism 4. Further, the voltage and power for driving the illumination device 25 is of of low-voltage and low-power, and is isolated from commercial power supply via a power supply transformer, a rectifier circuit and the like, so that there will be no problem even if someone touches the slide mechanism 4.

As described, power is supplied from the power supply unit 10 via the power supply path composed of the slide mechanism 4 to the control unit 5 composed of the microcomputer disposed on the door 2a of the drawer body 2, and signals output from the control unit 5 are also transmittable. Therefore, even if the drawer body 2 is drawn out for a long time such as for cleaning the interior of the heating chamber 3, when the user performs operation to close the drawer body 2, the control unit 5 is activated immediately in response to the operation, and can transmit control signals to the drive mechanism or the like via the transmission path 8 composed of the slide mechanism 4.

Figure 3:
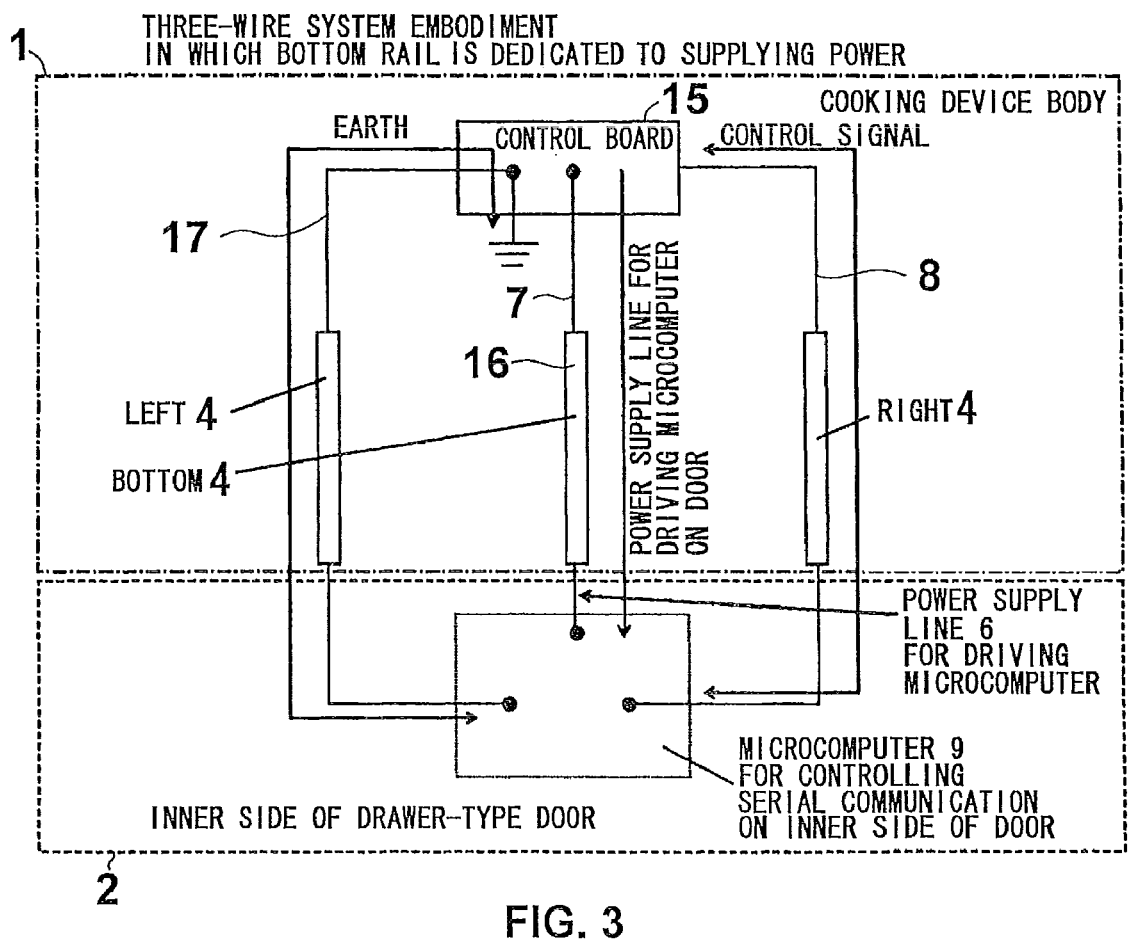
FIG. 3 is an explanatory view showing an embodiment of a three-wire system in which a bottom rail of the drawer type cooking device according to the present invention is dedicated to supplying power.

FIG. 3 is an explanatory view of an embodiment of the drawer type cooking device having a three-wire power supply line system according to the present invention. In the embodiment illustrated in FIG. 3, the fixed and movable slide rails of the bottom slide mechanism 4 receives control of a control board 15 on the cooking device body 1 and used as driving power supply lines 6 and 7 for supplying power to the control unit 5 disposed on the door and as a power supply line 16. The slide mechanism 4 disposed on the right side is used as a portion of the transmission path 8 for transmitting signals between the control unit 5 on the drawer body 2 and the control board 15 on the cooking device body 1. Further, the slide mechanism 4 disposed on the left side is used as a portion 17 of the earth wire for providing earth connection between the control unit 5 on the drawer body 2 and the control board 15 on the cooking device body 1. According to this arrangement, the door 2a is connected to the earth wire 17.

Figure 4:
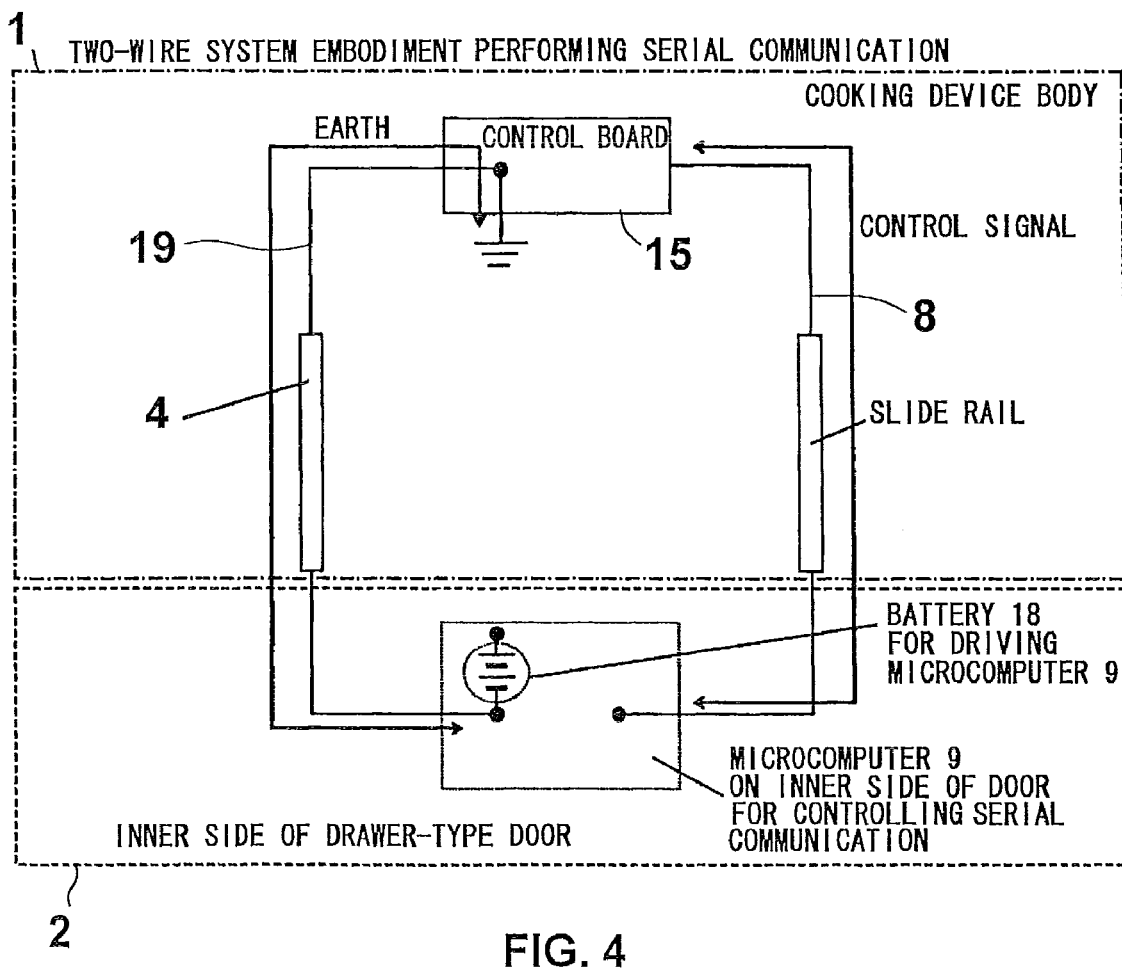
FIG. 4 is an explanatory view showing an embodiment of the drawer type cooking device according to the present invention in which two-wire serial communication is performed.

FIG. 4 is an explanatory view of an embodiment of the drawer type cooking device performing a two-wire serial communication according to the present invention. In the embodiment shown in FIG. 4, the bottom slide mechanism 4 only exerts a sliding function, and it is not used as a path for power supply and signals. The door 2a of the drawer body 2 is provided with a control unit 5 for controlling the serial communication and a battery 18 for driving the control unit 5. Therefore, similar to the embodiment shown in FIG. 3, the slide mechanism 4 on the right side is used as a transmission path 8 for sending and receiving control signals between the control unit 5 on the drawer body 2 and the control board 15 on the cooking device body 1, but the slide mechanism 4 on the left side is used as a charge/earth wire 19 functioning as a power charging line for charging the battery 18 and for providing earth connection between the control unit 5 and the control board 15 on the cooking device body 1.

According to the present embodiment, the left and right slide mechanisms 4 and 4 are constantly used as power supply paths and transmission paths, but the drawer type cooking device according to the present invention is not restricted to such application, and for example, the bottom slide mechanism disposed on the outer side of the heating chamber can be used for supplying power and transmitting signals (if necessary, the bottom slide mechanism 4 can be composed of a plurality of rails).

The method of signal transmission is not restricted to a specific system, and for example, a communication system adopting an UART (Universal Asynchronous Receiver Transmitter) can be used. The use of this communication system is preferable, since the microcomputer mounted on the control board is normally equipped with a three-wire serial communication function utilizing UART, which enables connection with the control circuit without converting the voltage level used for signal transmission. In this case, by applying DC voltage to one wire, the wire can also be used for supplying power.

However, since high-frequency cooking devices are exposed to jamming caused by high-output microwaves supplied to the heating chamber and switching noises generated by the inverter power supply, if it is difficult to perform signal transmission via the voltage level of UART, it is preferable to perform signal transmission via a voltage level of RS-232C.

Furthermore, since the capacity of the data being transmitted according to the present invention is extremely small, it is possible to perform signal transmission using two wires via a unique control function, without adopting communication standards such as UART and RS-232C requiring three wires. According to the present system, signal transmission is enabled even in a structure where the bottom slide mechanism cannot be used as a power conducting path, and the present system is more preferable since it can be applied to a device having no bottom slide mechanism and only two left and right slide mechanisms.

Some plain paper copiers are provided with a movement mechanism having a conducting function, but such movement mechanism is designed to conduct electricity so as to gradually discharge the static electricity charged in the toner fixing unit or the paper supplying mechanism, and it is not aimed at supplying power or for transmitting signals. According to such arrangement, the reliability required in the present art of drawer type cooking devices such as stable signal voltage level and prevention of noise failure is not guaranteed, and therefore, they cannot be applied to the field of drawer type cooking devices.

Figure 5:
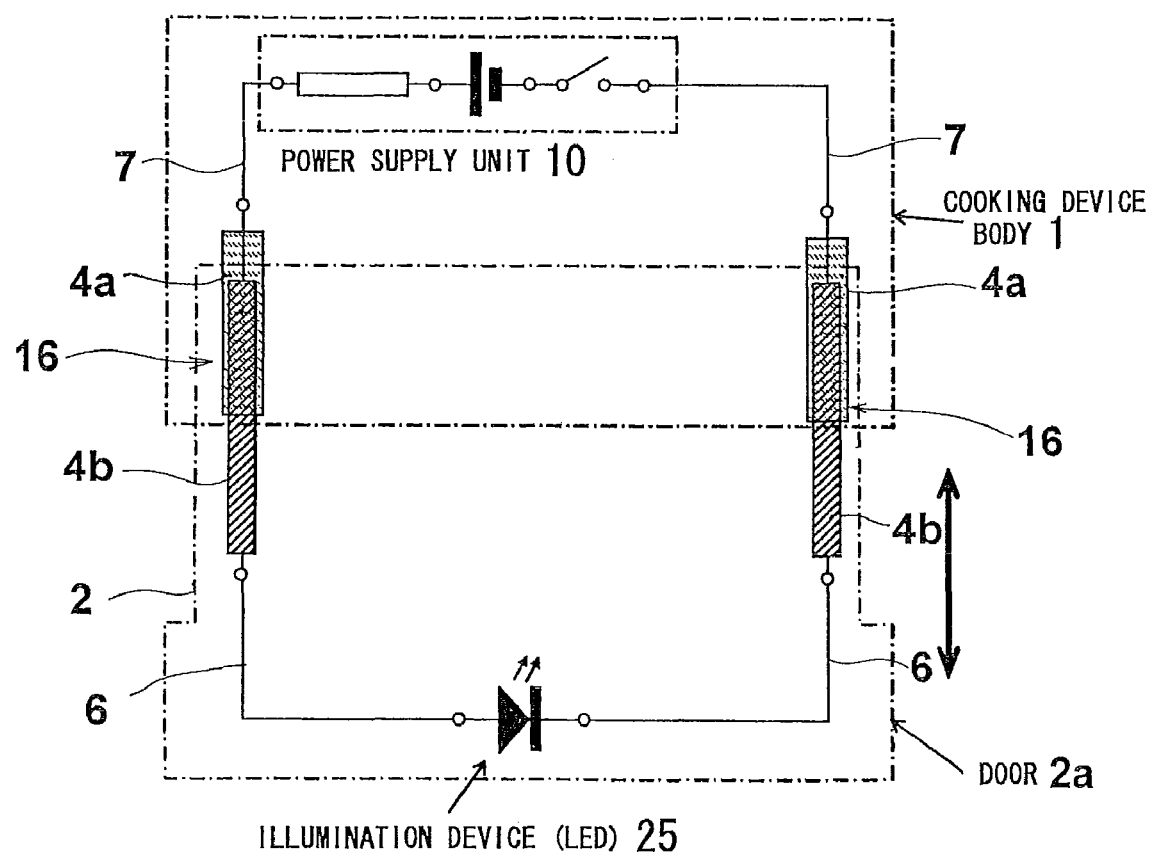
FIG. 5 is a frame format showing power supply lines according to the drawer type cooking device shown in FIG. 1.

FIG. 5 is a frame format of the power supply lines according to the drawer type cooking device of the present invention. In the embodiment shown in FIG. 5, the fixed rail 4a and the movable rail 4b provided in the left and right slide mechanisms 4 and 4 are used as driving power supply lines 6 and 7 for supplying power to the illumination device 25 disposed on the door and as power supply lines 16 and 16 for supplying power from the power supply unit 10 on the cooking device body 1, wherein the power supply lines 16 and 16 supply power to the drawer body 2 from the cooking device body 1 via a two-wire connection.

Figure 6:
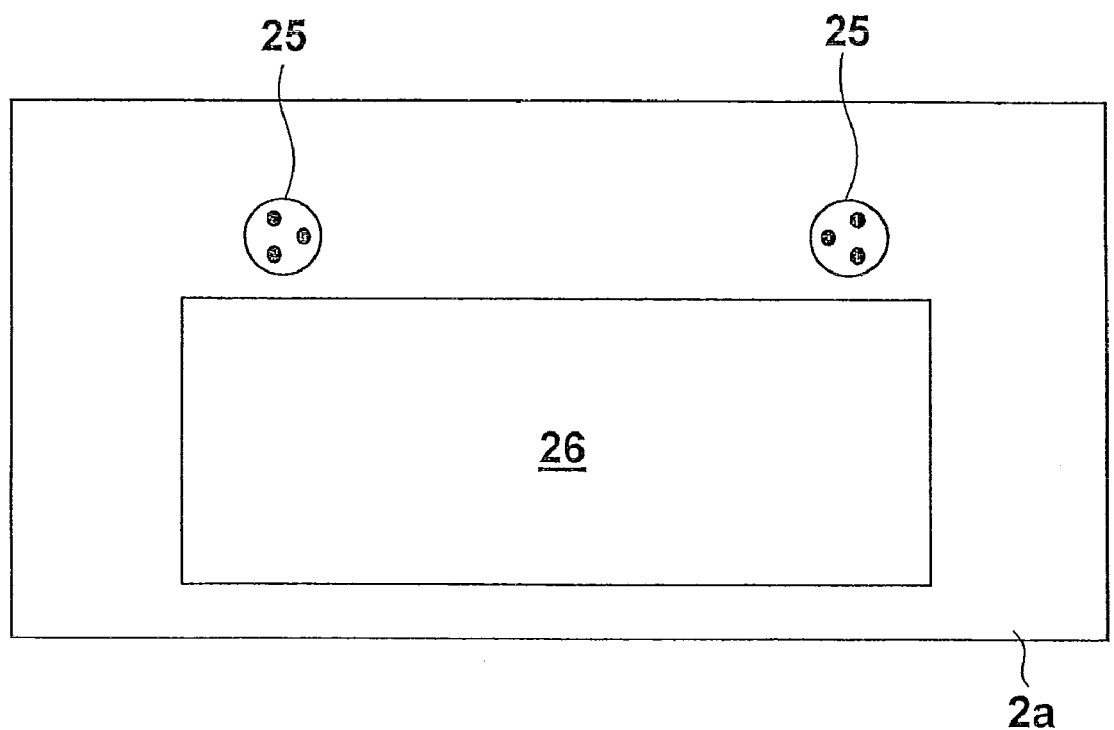
FIG. 6 is a frame format showing the inner side of the door of the drawer type cooking device shown in FIG. 1.

FIG. 6 is a view showing the inner side of the door of the drawer type heating cooker shown in FIG. 1. As shown in FIG. 6, illumination devices 25 and 25 are arranged on an upper position of a window 26b for viewing the interior of the cooking device (while blocking the transmission of microwaves) on the inner side of the door 2a so as to illuminate the interior of the drawer body 2. In this example, two LED illumination devices are provided, but the number can be selected appropriately according to the size of the width of the drawer body.

In the above-described embodiment, the left and right slide mechanisms 4 and 4 are used as power supply paths, but the drawer type cooking device according to the present invention is not restricted to such arrangement, and power can be supplied for example via the bottom slide mechanism disposed on the outer side of the heating chamber (the bottom slide mechanism 4 can be composed of a plurality of rails, if necessary).

Some plain paper copiers are provided with a movement mechanism having a conducting function, but such movement mechanism is designed to conduct electricity so as to gradually discharge the static electricity charged in the toner fixing unit or the paper supplying mechanism, and it is not aimed at supplying power or for transmitting signals. According to such arrangement, the reliability required in the present art of drawer type cooking devices such as stable signal voltage level and prevention of noise failure is not guaranteed, and therefore, they cannot be applied to the field of drawer type cooking devices.

What is claimed is:

1. A drawer type cooking device comprising:
a cooking device body having formed therein a heating chamber with an opening that communicates the heating chamber with an exterior;
a power supply unit disposed on the cooking device body;
a drawer body capable of being drawn out from the interior of the heating chamber of the cooking device body to the exterior, having a door capable of shutting the opening of the heating chamber when the drawer body is at a stored position within the heating chamber; and
movement mechanisms for moving the drawer body; wherein
the cooking device body has a control unit for controlling the operation of the cooking device;
the movement mechanisms are disposed on left and right outsides and a bottom side of the heating chamber;
the movement mechanisms include a fixed rail attached to the cooking device body and a movable rail attached to the door of the drawer body and slidable with respect to the fixed rail; wherein the drawer body has an operation unit to be operated by a user; and
the movement mechanisms disposed on left and right outsides and the bottom side of the heating chamber provide three-wire transmission paths to perform signal transmission between the power supply unit and the operation unit connecting the power supply unit and the operation unit, and one of the transmission paths serves as a power supply path supplying power for the operation unit, connecting the power supply unit and the operation unit.

2. The drawer type cooking device according to claim 1, wherein the transmission paths provided at the bottom side of the heating chamber provide for earth connection, two transmission paths provided on the left and right outsides of the heating chamber are provided for signal transmission between the operation unit and the control unit, and at least one of the two of the transmission paths is provided for the power supply paths.

3. The drawer type cooking device according to claim 1, wherein one of two transmission paths provided on the left and right outsides of the heating chamber is provided for earth connection, and another transmission path not being an earth connection among the two transmission paths provided on the left and right outsides of the heating chamber or one of the transmission paths provided at the bottom of the heating chamber is provided for the power supply paths.

4. A drawer type cooking device comprising:
a cooking device body having formed therein a heating chamber with an opening that communicates the heating chamber with an exterior;
a power supply unit disposed on the cooking device body;
a drawer body capable of being drawn out from the interior of the heating chamber of the cooking device body to the exterior, having a door capable of shutting the opening of the heating chamber when the drawer body is at a stored position within the heating chamber; and movement mechanisms for moving the drawer body; wherein the cooking device body has a control unit for controlling the operation of the cooking device;

the movement mechanisms are disposed on left and right outsides and a bottom side of the heating chamber;

the movement mechanisms include a fixed rail attached to the cooking device body and a movable rail attached to the door of the drawer body and slidable with respect to the fixed rail; wherein the drawer body has an operation unit to be operated by a user; and the movement mechanisms disposed on left and right outsides and the bottom side of the heating chamber provide two-wire transmission paths to perform signal transmission between the power supply unit and the operation unit connecting the power supply unit and the operation unit, and one of the transmission paths serves as a power supply path supplying power for the operation unit, connecting the power supply unit and the operation unit.

5. The drawer type cooking device according to claim 3, wherein one of the transmission paths is provided for earth connection, and another of the transmission paths serves as both power supply paths for supplying power by overlapping transmission and concerned signals.

6. The drawer type cooking device according to any one of claims 1 to 5, wherein the drawer body has a display unit and displays operation information on the display unit according to operation of a user at the operation unit.

* * * * *